United States Patent Office

2,811,519
Patented Oct. 29, 1957

2,811,519

MIXED CELLULOSE ETHERS AND THEIR PREPARATION

George P. Touey, Kingsport, Tenn., assignor to Eastman Kodak Company, Rochester, N. Y., a corporation of New Jersey No Drawing. Application February 5, 1954, Serial No. 408,575

5 Claims. (Cl. 260—231)

This invention relates to a cellulose ether containing both sulfoethyl and carboxy methyl groups in which there is present sufficient sulfoethyl to render the ether soluble in aqueous solutions having a low pH or containing polyvalent metal ions.

It has been known in the art that the water soluble cellulose ether, carboxymethyl cellulose, has properties which make that cellulose ether valuable for various purposes such as a suspending agent, for film forming material, as a thickening agent, as a laundering aid and the like. That material however possesses two properties which act as limitations to its usefulness. Carboxymethyl cellulose is insoluble in aqueous solutions at a pH of 3 or lower and it is insoluble in aqueous solutions containing more than a trace of di or polyvalent metal ions. Because of these properties carboxymethyl cellulose is unsuitable for use in excessively hard water or in water containing moderately strong acids such as might be met with in its use as a detergent or in drilling muds.

One object of my invention is to provide a cellulose ether which exhibits solubility in water having a pH of not more than 3. Another object of my invention is to provide a water soluble cellulose ether which is soluble also in aqueous solutions of salts having polyvalent metal ions. Still another object of my invention is to provide a cellulose ether which contains both sulfoethyl and carboxymethyl substituents. A further object of my invention is to provide a method of making mixed cellulose ethers in which the cellulose is subjected to the action of both sulfoethylating agents and carboxymethylating agents in either one step or a series of steps. Other objects of my invention will appear herein.

I have found that by including sulfoethyl groups as well as carboxymethyl groups in a cellulose ether that it is possible to impart properties thereto so that the resulting product is soluble in aqueous solutions which are strongly acid and in aqueous solutions containing polyvalent metal ions such as calcium, aluminum, zinc, magnesium, iron and the like. I have found that the amount of sulfoethyl groups which must be introduced along with the carboxymethyl groups to render the product salt and acid compatible varies to some degree in accordance with the amount of carboxymethyl groups present and the degree of polymerization of the product. As a rule the lower viscosity products require a lesser number of sulfoethyl groups to give the desired compatibility with salts and acids. On the other hand with an increase of the carboxymethyl groups present in the polymer the greater will be the proportion of sulfoethyl groups which are required to give compatibility with acids and polyvalent metal salts. I have found that the cellulose ether at the very least must contain one sulfoethyl group for every 10 glucose units of the cellulose to be considered resistant to precipitation by acids and multivalent metal ions and it is even preferred that the cellulose ethers have at least 0.15–.3 sulfoethyl groups (—CH₂—CH₂—SO₃Na) per glucose unit together with 0.25–2.5 carboxymethyl groups per glucose unit to obtain compatibility with acids and polyvalent metal ions.

It would appear that the introduction of sulfoethyl groups into a carboxymethyl cellulose structure to alter its solubility characteristics is unique as it was unexpected that cellulose containing sulfoethyl groups and carboxymethyl groups would be more compatible with multivalent ions and acids than cellulose containing carboxymethyl groups alone. Although it is known to the art that it is possible to prepare a water soluble sulfoethyl cellulose that is compatible with acids and salts it has not been heretofore known that the introduction of a small proportion of sulfoethyl groups into carboxymethyl cellulose would inactivate its normally salt and acid sensitive carboxyl groups.

In preparing the mixed cellulose ethers of this invention the sulfoethylating agents may be water soluble salts or esters of ethionic acid, vinyl sulfonic acid or haloethane sulfonic acid. The reactions which occur are illustrated by the following equations:

(a) Using cellulose and sodium vinyl sulfonate

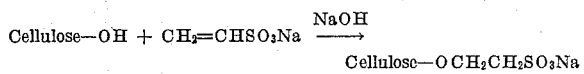

(b) Using cellulose and a salt of ethionic acid

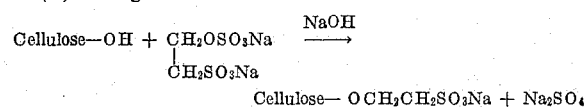

(c) Using cellulose and a salt of chloroethane sulfonic acid

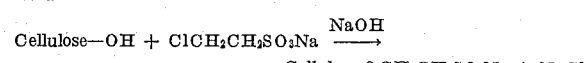

The carboxymethylating agent may be any of the monohalogenated acetic acids particularly chloroacetic acid or its water-soluble salts. The reaction which occurs may be represented by the following equation.

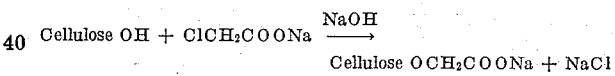

The reactions to form the mixed ether may be carried out separately or simultaneously. For instance, the sulfoethylation step may be carried out after the carboxymethylation step or vice versa. I have found that the most desirable procedure is to carry out the carboxymethylation and sulfoethylation of the cellulose simultaneously.

As a general method the preparation of cellulose ethers in accordance with my invention may be carried out by reacting one mole of cellulose at 25–100° C. in the presence of strong aqueous NaOH with a mixture consisting of 0.1–1.0 mole of a sulfoethylating agent and 0.25–3.0 moles of a carboxymethylating agent until a water-soluble product is obtained. This combination of etherifying agents, cellulose, and aqueous NaOH are mixed together by the conventional procedures used in preparing cellulose ethers. For instance, the cellulose can be first pretreated with aqueous alkali alone to make the intermediate product, alkali cellulose, and the alkali and etherifying agents can be added to the cellulose initially as it is used. It is possible to add an aqueous solution of the etherifying agents to the cellulose either before or after the addition of the alkali. The amount of concentration may vary over a reasonably wide range. In practice however I have found it more suitable to employ an amount and concentration of NaOH that would keep that mixture of cellulose and NaOH within the range of 0.5–3.0 parts of NaOH (dry weight basis) to one part of cellulose.

In etherifying cellulose it is sometimes desirable to employ an organic solvent as an inert slurrying agent or dispersing medium for the reactants. Some organic solvents which might be employed in this connection are water miscible alcohols such as ethyl or isopropyl, ketones such as acetone or methyl ethyl ketone or ethers which are suited to keep the mixed ether which is prepared in a solid suspended state. I have found that usually this facilitates the isolation of the ether when it reaches the stage of water solubility.

The following examples illustrate the practice of my invention:

Example 1

10 parts of cotton linters (0.062 mole) were mercerized in 40% NaOH for 2 hours and pressed to a weight of 40 parts. This pressed "alkali-cellulose" was mixed for 4 hours at 60° C. with 9 parts of a mixture consisting of 3 parts (0.018 mole) of 2-chloroethane sodium sulfonate and 6 parts (0.052 mole) of sodium chloroacetate. The product thus obtained was poured into a liter of 7:3 methanol-water, neutralized with acetic acid and filtered with 7:3 methanol-water until the washings gave a negative test for chloride ion. Analyses of the dry product indicated an average degree of substitution of 0.22 sulfoethyl group and 0.45 carboxymethyl groups per glucose unit. A 3% solution of the cellulose ether had a viscosity of 900 cps. at 25° C. Portions of this solution were mixed with equal volumes of 5% aqueous solutions of acids and salts and in every case a clear free flowing solution was obtained. The acids and solutions which were separately employed to test the solubility of the cellulose ether in this testing are as follows: sulfuric acid, hydrochloric acid, formic acid, calcium chloride, magnesium chloride, copper sulfate and aluminum sulfate.

The procedure described for preparing a cellulose ether was repeated with the exception that sodium chloroacetate only was employed as the etherifying agent. Three samples were prepared, the amount of sodium chloroacetate varying. It was found that upon increase of the amount of sodium chloroacetate products were obtained with increasing degrees of substitution. The products thus obtained were dissolved in water of 3% concentration and the solutions were tested for salt and acid compatibility in the same manner as the mixed ether was tested. It was found that precipitation occurred in each of the solutions of acids and salts in which the mixed cellulose ether remained clear and free flowing.

Example 2

10 parts of cotton linters were mercerized in 35% NaOH for 2 hours and then pressed to a weight of 40 parts. The pressed material was mixed for 3 hours at 50° C. with 13 parts of a mixture consisting of 5 parts of sodium vinyl sulfonate and 8 parts of sodium chloroacetate. The product thus obtained was poured into 1000 parts of 70% methanol, neutralized with hydrochloric acid, filtered and washed in 70% methanol until free of inorganic salts. Analyses indicated 0.27 sulfoethyl group and 0.62 carboxymethyl groups per glucose unit. The mixed ether thus obtained gave a highly viscous solution when dissolved in water to a concentration of 5%. It was soluble in 5% sulfuric acid and in 3% solutions of calcium chloride, magnesium acetate and copper sulfate. Commercial grades of sodium carboxymethyl cellulose of high, medium and low viscosity types were all found to be insoluble in these solutions.

Example 3

A slurry was prepared of 30 parts of powdered cellulose in 800 parts of isopropanol and while vigorously stirring 75 parts of aqueous sodium hydroxide of 32% concentration and 12 parts of disodium ethionate was added thereto. The mass was slowly heated to 50° C. with continuous stirring and was maintained at this temperature for 1 hour. The mixture was then cooled to 30° C. and 25 parts of sodium chloroacetate were added. The mixture was stirred for 4 additional hours while maintaining the temperature at 30° C. The mass was filtered and the product obtained was successively washed with 6:4 methanol-water. The sulfoethyl-carboxymethyl cellulose obtained contained 0.15 sulfoethyl groups and 0.38 carboxymethyl groups per glucose unit. The product was soluble in water and a 5% solution thereof had a viscosity of 800 cps. at 25° C. This solution was compatible with both the acid and salt solutions as listed in Example 1.

I claim:

1. A method of producing a water soluble carboxymethyl cellulose which will not precipitate from its aqueous solutions on the addition of strong acids or of polyvalent metal ions which consists of introducing 0.1–0.3 sulfoethyl groups per $C_6$ cellulose unit into a carboxymethyl cellulose containing 0.25–2.50 carboxymethyl groups per $C_6$ cellulose unit.

2. A method of producing a salt and acid compatible carboxymethyl cellulose as defined in claim 1 wherein the sulfoethylating agent is selected from the group consisting of the water soluble salts and esters of ethionic acid, vinyl sulfonic acid and haloethane sulfonic acid.

3. A method of producing a salt and acid compatible carboxymethyl cellulose in accordance with claim 1 wherein the sulfoethylating agent is 2-chloroethane sodium sulfonate.

4. A method of producing a salt and acid compatible carboxymethyl cellulose in accordance with claim 1 wherein the sulfoethylating agent is sodium vinyl sulfonate.

5. A method of producing a salt and acid compatible carboxymethyl cellulose in accordance with claim 1 wherein the sulfoethylating agent is disodium ethionate.

References Cited in the file of this patent

UNITED STATES PATENTS

| | | |
|---|---|---|
| 2,132,181 | Neugebauer et al. | Oct. 4, 1938 |
| 2,510,153 | Swinehart | June 6, 1950 |